United States Patent Office 3,340,593
Patented Sept. 12, 1967

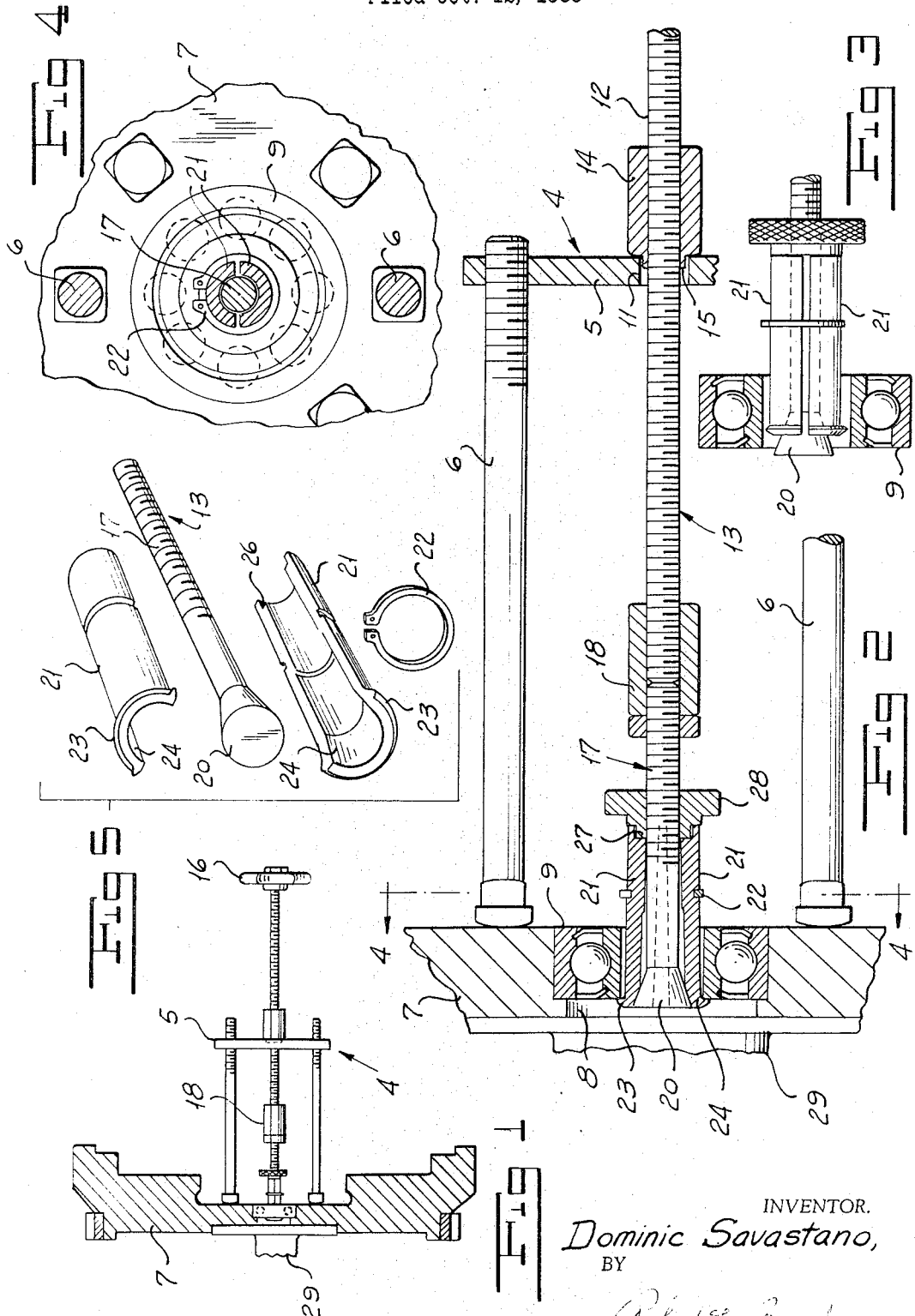

3,340,593
SPLIT SLEEVE BEARING PULLER
Dominic Savastano, 15 Iowa Ave.,
Paterson, N.J. 07503
Filed Oct. 12, 1966, Ser. No. 586,069
1 Claim. (Cl. 29—262)

ABSTRACT OF THE DISCLOSURE

A bearing puller having split sleeve fingers and a resilient, unitary, split ring disposed within a slot in the outer circumference thereof at the midpoint between the bearing contacting flanges on one end and the collar abutting the other end.

---

My invention relates to extracting means and more particularly to a bearing puller for use in removing bearings from various devices, for instance, flywheels or the like. More particularly, my invention relates to a bearing puller wherein the fingers which are spread for gripping the bearing race to be pulled are of a relatively long, split sleeve construction grooved circumferentially to receive a unitary, split ring member for urging the parts of the sleeve together to facilitate the insertion thereof into the bearing bore.

One of the aims or objects of my invention is to provide a bearing puller which is so constructed and arranged as to be inserted through the bore of a ball bearing and then manipulated to effect positive engagement with a radial face of the bearing in order that the latter may be readily removed from binding relation with the respective device.

Another aim of my invention is to provide a bearing puller of the foregoing described character which, by reason of engagement with a radial face of the bearing, will preclude slippage or disengagement of the puller relative to the bearing during removal of the bearing.

A further aim of my invention is to provide a bearing puller of the foregoing described character having bearing-gripping components of a size to readily fit within the relatively narrow space usually occurring between the bearing and an object connected to the device containing the bearing.

A still further aim of my invention is to provide a bearing puller of the foregoing described character, which is simple in construction, efficient in operation, durable in use, economical in manufacture, and capable of having interchangeable components to accord with the size of a bearing to be removed.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

FIGURE 1 is a side elevation of my invention illustrating the same connected with a bearing of a flywheel, the latter being shown in section;

FIGURE 2 is a view similar to FIGURE 1 but illustrating the bearing puller in section;

FIGURE 3 is a side elevation of the front portion of the bearing puller with the gripping fingers or components being shown in collapsed condition within the bore of the bearing;

FIGURE 4 is a sectional view taken on line 4—4 of FIGURE 2; and

FIGURE 5 is a disassembled perspective view of the front portion of the puller.

As illustrated in the drawings, my bearing puller comprises a yoke 4 having a cross-piece or bar 5 in which are threaded the ends of a pair of spaced bolts 6 or the like, the opposite end of said bolts engaging the face of a device, for instance, a flywheel 7. The bore 8 of the flywheel contains a ball bearing 9 which is usually wedged within the bore 8, whereby considerable difficulty is often experienced in removing or extracting the bearing 9 from the flywheel for replacement.

The bar 5 is provided with an opening 11 through which extends the rear section 12 of a threaded rod 13 on which is threaded a nut 14 formed with a collar 15 extending into the opening 11 for maintaining the rod in spaced relation with the bar 5 within the opening. The rod is provided on its outer end with a handle 16 for rotating the rod in a desired direction. As shown in FIGURE 2, this construction enables the nut 14 to be rotated relative to the bar and thus effect forward or rearward movement of the rod freely relative to the bar 5 for a purpose hereinafter made apparent. The front section 17 of the rod, which constitutes a bearing gripping unit, is connected by means of a lock nut assembly 18, whereby the unit 17 may be removed for replacement.

The front end of the rod 13 is provided with a frustum-shaped head 20 for cooperation with a pair of separable components or fingers 21 disposed about the rod and held thereabout by means of a resilient split ring 22 disposed within slots about the fingers and which functions to urge the fingers 21 toward each other about the rod. The front ends of the fingers are formed with flanges 23 for engaging the radial face of the bearing 9 circumjacent its bore as depicted in FIGURE 2. The front ends of the fingers are also formed with inclined inner faces 24 for sliding engagement with the head 20 to effect movement of the fingers 21 when the head is moved in a direction inwardly between the fingers as shown in FIGURE 2. When the head is moved outwardly of the fingers, the latter will be moved by the ring 22 to a collapsed or closed position about the rod, as illustrated in FIGURE 3.

The rear ends of the fingers 21 are formed on their inner faces with grooves 26 in which project a collar 27 of a nut 28 threaded on the rod 13. Rotation of the nut 28 in one direction will force the outer ends of the fingers over the inclined surface of the head 20, away from the axis of the rod 13, and against the tension of the spring 22. When the nut 28 is rotated in the opposite direction, the outer ends of the fingers will slide on the head 20 toward each other and the axis of the rod by the action of the spring 22.

In operation, assuming the fingers are in the closed position illustrated in FIGURE 3, the front section of the bolt is moved forwardly through the bore 8 of the bearing 9 to position the flanges 23 outwardly of the bearing, whereupon the nut 28 is rotated to move the fingers over the head, away from each other, and dispose the flanges 23 in engagement with the radial face of the bearing, as clearly illustrated in FIGURE 2. When the parts are thus positioned, the nut 14 is rotated to maintain the bolts 6 of the yoke 4 in fixed relation with the flywheel 7, as shown in FIGURES 1 and 2. Rotation of the rod 13 by the handle 16, by reason of the engagement of the nut 14 with the bar 15, serves to move the rod in the direction away from the flywheel 7, with the result that the bearing 9 is pulled out of the bore 8 of the flywheel bearing and is thus removed, the nut 28 is actuated to move the fingers to closed position and permit the unit to be withdrawn from the bearing through the bore 8.

The flywheel 7, in the instance of an engine of a motor vehicle, is usually connected to the crank shaft 29 by means of a flange-plate 30 which is disposed in close relation with the adjacent radial face of the bearing 9, the distance between the flange-plate 30 and bearing 9 often being as small as one-eighth of an inch. By equipping the front ends of the fingers 21 with the flanges 23, it is possible to effect positive gripping of the radial face of the bearing by the flanges 23 in the relatively small space between the plate and the bearing, as clearly illustrated in FIGURE 2, thus eliminating slipping of the unit relative to the bearing during withdrawal of the bearing. In other words, my invention provides a positive locking engagement of the unit with the radial face of the bearing to effect its withdrawal.

Inasmuch as bearings having bores of different sizes are common, the bearing gripping unit is interchangeable for one of a proper size by removing the unit from the lock nut assembly 18 and replacing it with a unit of a desired size.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is, therefore, to be understood that the invention is not limited to the specific construction as illustrated and described, as the same is only illustrative of the principles involved which are capable of extended application in various forms, and the invention comprehends all construction within the scope of the appended claim. It is to be understood that the language used herein and in the claim is intended to cover all the generic and specific features of the invention herein described, and all statements of the scope of the invention which, as a matter of language, may be said to fall therebetween.

What is claimed is:

A bearing puller comprising a yoke adapted to engage an object,
a threaded rod extending through said yoke, said rod terminating in a frustum-shaped head,
a nut threaded on said rod between said yoke and said head, said nut having a cylindrical collar,
a bearing gripping unit having two fingers each comprising one longitudinal half of a cylinder, each of said fingers being provided at one end with a semi-cylindrical peripheral flange in position when expanded to grip the radial face of a bearing confined in a bore of said object over substantially the circumference thereof and adapted at the other end to receive said cylindrical collar, said fingers being radially expanded by said frustum-shaped head from a closed position about said rod on the withdrawal of said rod through said yoke,
said fingers having a circumferential groove in the external surface thereof substantially midway of the length, and a unitary resilient split ring spring member disposed in said groove embracing the fingers and normally tending to urge the latter from an expanded position to a closed position about said rod, and
means for withdrawing said rod through said yoke.

References Cited

UNITED STATES PATENTS

| 1,429,567 | 9/1922 | Carlisle | 29—262 |
| 1,521,008 | 12/1924 | Clay | 29—262 X |
| 1,650,964 | 11/1927 | Schmitt | 29—262 |
| 1,778,802 | 10/1930 | Howell | 29—262 |
| 1,958,330 | 5/1934 | Beard | 29—255 |

FOREIGN PATENTS 1,045,330  11/1958  Germany.

OTHELL M. SIMPSON, *Primary Examiner.*

MYRON C. KRUSE, *Examiner.*